(12) United States Patent
Shah et al.

(10) Patent No.: US 8,745,361 B2
(45) Date of Patent: Jun. 3, 2014

(54) SANDBOXED EXECUTION OF PLUG-INS

(75) Inventors: Nirav Yogesh Shah, Bothell, WA (US);
Allen F. Hafezipour, Bothell, WA (US);
Steve Jamieson, Bellevue, WA (US);
Shashi Ranjan, Redmond, WA (US)

(73) Assignee: Microsoft Corporation, Redmond, WA (US)

(*) Notice: Subject to any disclaimer, the term of this patent is extended or adjusted under 35 U.S.C. 154(b) by 1244 days.

(21) Appl. No.: 12/326,114

(22) Filed: Dec. 2, 2008

(65) Prior Publication Data
US 2010/0138639 A1 Jun. 3, 2010

(51) Int. Cl.
*G06F 21/53* (2013.01)
*H04L 1/00* (2006.01)
*G06F 11/00* (2006.01)
*G06F 12/14* (2006.01)
*G06F 12/16* (2006.01)
*G08B 23/00* (2006.01)
*G06F 7/38* (2006.01)
*G06F 9/44* (2006.01)
*H04L 29/08* (2006.01)

(52) U.S. Cl.
CPC .............. *G06F 21/53* (2013.01); *H04L 67/02* (2013.01)
USPC ............................................ 712/227; 726/22

(58) Field of Classification Search
CPC .................................. G06F 21/53; H04L 67/02
USPC ............................................................ 712/227
See application file for complete search history.

(56) References Cited

U.S. PATENT DOCUMENTS

| | | | |
|---|---|---|---|
| 5,974,549 A | * | 10/1999 | Golan ............................. 726/23 |
| 6,275,938 B1 | | 8/2001 | Bond et al. |
| 6,757,685 B2 | | 6/2004 | Raffaele et al. |
| 6,836,888 B1 | | 12/2004 | Basu et al. |

(Continued)

FOREIGN PATENT DOCUMENTS

WO    WO 3054704 A1 * 7/2003 .............. G06F 11/30

OTHER PUBLICATIONS

Moshchuk, Alexander, Steven D. Gribble, and Henry M. Levy; Flashproxy: Transparently Enabling Rich Web Content via Remote Execution; Department of Computer Science and Engineering, University of Washington, Seattle, WA; MobiSys '08; Jun. 17-20, 2008.*

(Continued)

*Primary Examiner* — Carolyn B Kosowski
(74) *Attorney, Agent, or Firm* — Jim Ross; Leonard Smith; Micky Minhas

(57) ABSTRACT

A sandbox architecture that isolates and identifies misbehaving plug-ins (intentional or unintentional) to prevent system interruptions and failure. Based on plug-in errors, the architecture automatically disables and blocks registration of the bad plug-in via a penalty point system. Publishers of bad plug-ins are controlled by disabling the bad plug-ins and registering the publisher in an unsafe list. Isolation can be provided in multiple levels, such as machine isolation, process isolation, secure accounts with limited access rights, and application domain isolation within processes using local security mechanisms. A combination of the multiple levels of isolation achieves a high level of security. Isolation provides separation from other plug-in executions and restriction to system resources such as file system and network IP. Moreover, the architecture is highly scalable, stateless, and low administration architecture for the execution of the plug-ins, which can be scaled by adding/removing additional sandbox servers on-the-fly without prior configuration.

20 Claims, 12 Drawing Sheets

(56) References Cited

U.S. PATENT DOCUMENTS

| | | | | |
|---|---|---|---|---|
| 7,062,417 | B2* | 6/2006 | Kruger et al. | 703/2 |
| 7,519,809 | B2* | 4/2009 | Achanta et al. | 713/100 |
| 7,845,006 | B2* | 11/2010 | Akulavenkatavara et al. | 726/22 |
| 8,146,109 | B2* | 3/2012 | Shneerson et al. | 719/328 |
| 8,214,364 | B2* | 7/2012 | Bigus et al. | 707/737 |
| 2002/0197528 | A1 | 12/2002 | Zunke | |
| 2004/0193599 | A1 | 9/2004 | Liu et al. | |
| 2004/0193912 | A1* | 9/2004 | Li et al. | 713/200 |
| 2004/0252325 | A1 | 12/2004 | Lawrence | |
| 2006/0021029 | A1 | 1/2006 | Brickell et al. | |
| 2006/0195745 | A1 | 8/2006 | Keromytis et al. | |
| 2006/0229741 | A1 | 10/2006 | Achanta et al. | |
| 2007/0226773 | A1 | 9/2007 | Pouliot | |
| 2007/0244980 | A1 | 10/2007 | Baker, III et al. | |
| 2007/0265835 | A1 | 11/2007 | Smithline | |
| 2008/0016339 | A1 | 1/2008 | Shukla | |
| 2008/0028442 | A1* | 1/2008 | Kaza et al. | 726/4 |
| 2008/0070665 | A1 | 3/2008 | Gatto et al. | |
| 2008/0201691 | A1* | 8/2008 | Shneerson et al. | 717/108 |
| 2008/0288424 | A1* | 11/2008 | Iyengar et al. | 706/12 |
| 2009/0049547 | A1* | 2/2009 | Fan | 726/22 |
| 2009/0293121 | A1* | 11/2009 | Bigus et al. | 726/22 |
| 2010/0122343 | A1* | 5/2010 | Ghosh et al. | 726/23 |
| 2011/0154487 | A1* | 6/2011 | Nakayama et al. | 726/22 |

OTHER PUBLICATIONS

International Search Report and Written Opinion mailed for PCT application PCT/US2009/062922, mailed May 19, 2010, 11 pages.

Dan, et al., "ChakraVyuhal (CV): A Sandbox Operating System Environment for Controlled Execution of Alien Code", retrieved at <<http://itslab.csce.kyushu-u.ac.jp/ssr/Links/RC20742.pdf>>, IBM Research Report, pp. 23.

Jermyn, et al., "Out of the Sandbox: Third Party Validation for Java Applications", retrieved at <<http://citeseerxist.psu.edu/viewdoc/summary?doi=10.1.1.27.8561>>, pp. 4.

"European Search Report", Mailed Date: Aug. 21, 2012, Application No. 09830799.4, Filed Date: Nov. 2, 2009, pp. 9.

Moshchuk, et al., "Flashproxy:transparently enabling rich web content via remote execution", Retrieved at <<http://homes.cs.washington.edu/~gribble/papers/sys169-moshchuk.pdf>>, Alexander Moshchuk etc, MobiSys'08 Proceedings of the 6th international conference on Mobile systems, applications, Jun. 20, 2008, pp. 81-93.

Santhanam, et al., "Deploying Virtual Machines as Sandboxes for the Grid", Retrieved at <<http://research.cs.wisc.edu/htcondor/doc/SandboxingWorlds053.pdf>>, Worlds, Proceedings of the 2nd conference on Real, Large Distributed Systems, vol. 2, pp. 7-12.

"Notice on the First China Office Action", Mailed Date: Nov. 29, 2012, Application/Patent No. 200980149127.7, Filed Date: Nov. 2, 2009, pp. 9.

"The State Intellectual Property Office of The People's Republic of China", Office Action dated Jan. 9, 2014, Application No. 200980149127.7, 16 pages.

* cited by examiner

SANDBOXED EXECUTION OF PLUG-INS

BACKGROUND

With the existing number of applications currently deployed, software vendors seek ways in which to provide value to customers other than through new product purchases. This can be served by providing a feature that allows custom code to run as part of a normal application operation. The custom code is added in the form of "plug-ins" or auxiliary applications which can be configured to run at specific points in the application operation. In an online environment, it becomes challenging as the code runs on a hosted server, and hence, errors in coding or malicious code can cause damage to the corporate computer systems or corporate networks.

SUMMARY

The following presents a simplified summary in order to provide a basic understanding of some novel embodiments described herein. This summary is not an extensive overview, and it is not intended to identify key/critical elements or to delineate the scope thereof. Its sole purpose is to present some concepts in a simplified form as a prelude to the more detailed description that is presented later.

The disclosed architecture is a unique combination of features that isolate the software plug-in code so that the code can be safely run inside a corporate hosted environment and yet perform useful functions for the environment. The architecture includes a sandbox system designed to identify and protect itself from misbehaving plug-ins, either intentional or non-intentional, to recover from errors, and to automatically disable and block registration of bad plug-ins via a penalty point system. The sandbox system also provides isolation from other plug-ins running on the same isolated system, and restricts access to sensitive information and resources such as machine name, IP address, file system, etc.

Isolation can be provided in multiple levels, such as machine isolation, process isolation, secure accounts with limited access rights, and application domain isolation within processes using local security mechanisms. A combination of the multiple levels of isolation achieves a high level of security.

Moreover, the architecture is a highly scalable, stateless, and low administration architecture for the execution of the plug-ins, which can be scaled simply by adding (or removing) additional sandbox servers on-the-fly without prior configuration.

To the accomplishment of the foregoing and related ends, certain illustrative aspects are described herein in connection with the following description and the annexed drawings. These aspects are indicative of the various ways in which the principles disclosed herein can be practiced and all aspects and equivalents thereof are intended to be within the scope of the claimed subject matter. Other advantages and novel features will become apparent from the following detailed description when considered in conjunction with the drawings.

DETAILED DESCRIPTION

Figure 1:
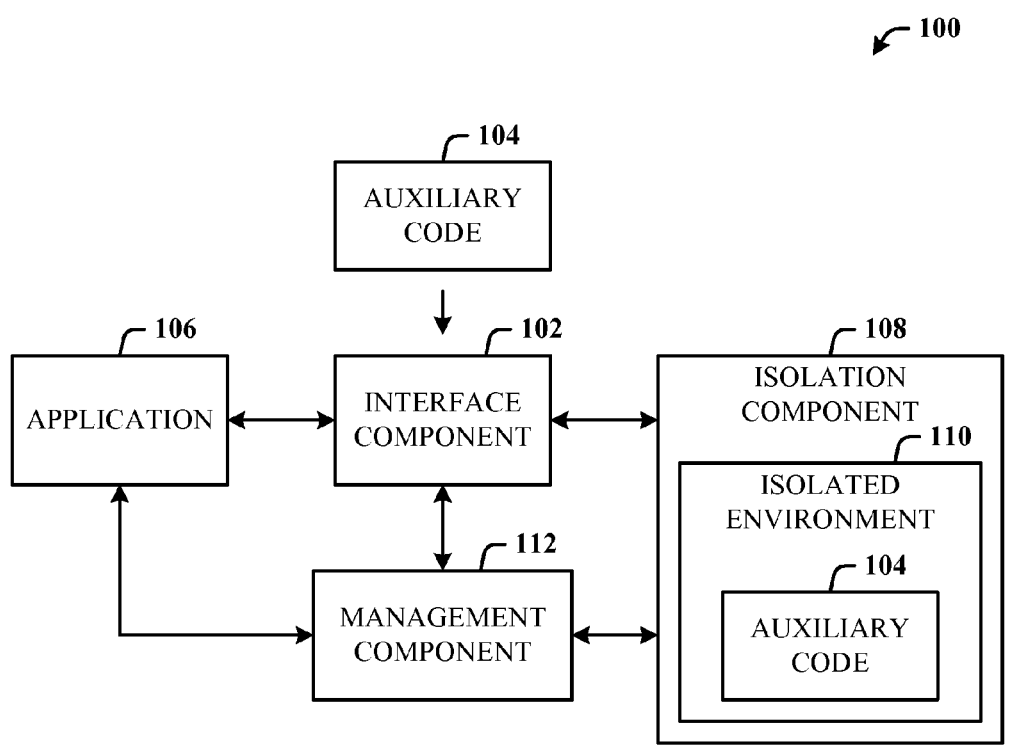
FIG. 1 illustrates a program management system in accordance with the disclose architecture.

The sandbox architecture isolates and identifies misbehaving plug-ins (intentional or unintentional) to prevent systematic interruptions and failure. If the plug-in introduces errors, the architecture automatically disables and blocks registration of the bad plug-in via a penalty point system. Isolation can be provided in multiple levels, such as machine isolation, process isolation, secure accounts with limited access rights, and application domain (e.g., AppDomain) isolation within processes using local security mechanisms (e.g., .Net Code Access Security). A combination of the multiple levels of isolation achieves a high level of security.

Moreover, the architecture is a highly scalable, stateless, and low administration architecture for the execution of the plug-ins, which can be scaled simply by adding (or removing) additional sandbox servers on-the-fly without prior configuration.

Reference is now made to the drawings, wherein like reference numerals are used to refer to like elements throughout. In the following description, for purposes of explanation, numerous specific details are set forth in order to provide a thorough understanding thereof. It may be evident, however, that the novel embodiments can be practiced without these specific details. In other instances, well known structures and devices are shown in block diagram form in order to facilitate a description thereof. The intention is to cover all modifications, equivalents, and alternatives falling within the spirit and scope of the claimed subject matter.

FIG. 1 illustrates a program management system 100 in accordance with the disclose architecture. The system 100 includes an interface component 102 for receiving auxiliary code 104 for execution with an application 106 (e.g., server). The interface component 102 can be part of the application 106, or a separate piece of code, for example. Alternatively, the interface component 102 can be part of the isolation component 108, for example.

The system 100 also includes an isolation component 108 for receiving and securely isolating the auxiliary code 104 in an isolated environment 110 using one or more levels of isolation, and a management component 112 for monitoring and managing execution of the auxiliary code 104 in the isolated environment 110 based in part on abnormal execution behavior.

The auxiliary code 104 can be a third-party plug-in received for execution with the application 106, which is a server application, and the isolation component 108 can be part of a sandbox server to which the auxiliary code 104 is sent for isolated execution. The one or more isolation levels include at least one of a machine isolation level, a process isolation level, or an application domain code access isolation level. In an alternative implementation, the design can be followed on the client separately or as well as on the server. In other words, the isolated plug-ins need not be processed solely on the server.

The interface component 102 ensures that calls from the auxiliary code 104 are directed to the appropriate application 106. In other words, where there are multiple applications running plug-ins in isolation, the interface component 102 correctly routes the calls from the plug-ins to the corresponding server application. The management component 112 stops execution of the auxiliary code 104 in the isolated environment 108 by disabling the auxiliary code 104. Registration of the auxiliary code 104 is blocked when the auxiliary code 104 has been disabled beyond a threshold number of times.

Figure 2:
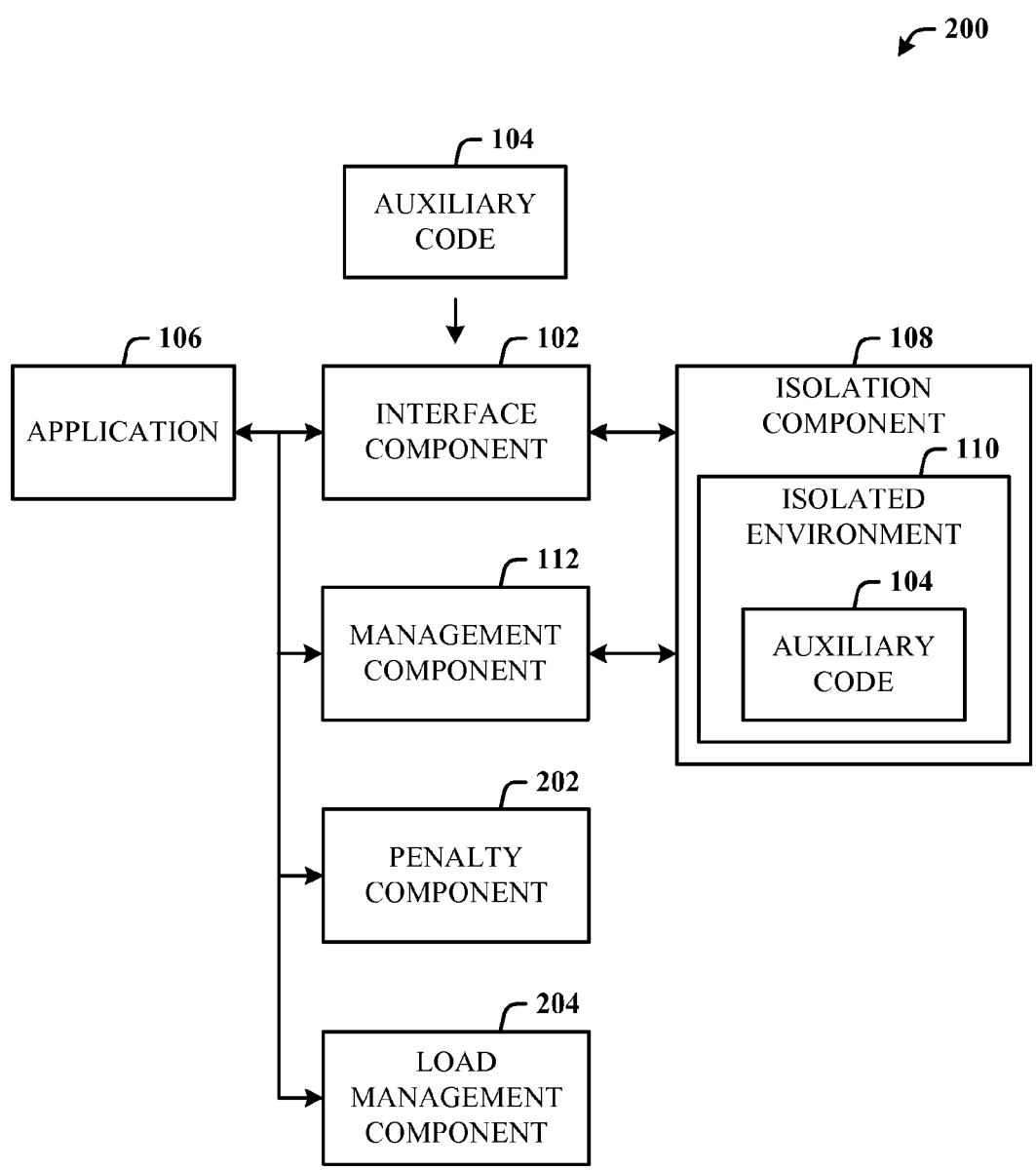
FIG. 2 illustrates a more detailed program management system that includes a penalty component for penalizing misbehaving auxiliary code.

FIG. 2 illustrates a more detailed program management system 200 that includes a penalty component 202 for penalizing misbehaving auxiliary code. The system 200 includes the interface component 102 for receiving auxiliary code 104 for execution with an application 106 (e.g., server), the isolation component 108 for receiving and securely isolating the auxiliary code 104 in the isolated environment 110 using one or more levels of isolation, and the management component 112 for monitoring and managing execution of the auxiliary code 104 in the isolated environment 110. The management component 112 will not allow running of the disabled auxiliary code 104, which is disabled due to the penalty system.

The penalty component 202 tracks the penalty points accumulated via the individual auxiliary code 104, and disables the auxiliary code 104 if the threshold is crossed. In other words, penalty points are allocated and accumulated for the misbehaving auxiliary code 104. The penalty component 202 includes a configurable penalty threshold the breach of which causes the blocking of further execution of that auxiliary code. When the penalty threshold has been breached, registration of that same auxiliary code 104 can be blocked based on the assembly signature.

The assembly signature includes the assembly name, assembly version, publisher public key token, and assembly culture information. The history of the assemblies disabled in the system can potentially serve as a data to decide which publishes should be disabled.

In an alternative embodiment, assembly registration can be also disabled via a publisher key token, which is a separate functionality and works independently from the penalty point system.

The interface component 102 can be located with the application 106, which can be a server application, on a server machine. Similarly, the management component 112 and/or the penalty component 202 can be collocated with the application 106 on the server machine. However, this is not a requirement, in that the interface component 102, management component 112, and penalty component 202 can be collocated with the isolation component 108, which can be an isolation server (also referred to as a "sandbox" server).

The system 200 can also include a load management component 204 for selecting one or more existing isolation components based on increased execution load, to even the load across multiple existing isolation components. In other words, it is within contemplation of the instant architecture that there will be multiple applications from the same or different servers for processing plug-ins (the auxiliary code). The plug-ins will then be sent to isolation servers for execution, monitoring, and management according to execution behavior. Misbehaving plug-ins will not be a threat to the corresponding application (and server), or other system disposed on the same network, for example.

Put another way, the program management system 200 comprises the interface component 102 for receiving the auxiliary code 104 for execution with the application 106 and ensuring that calls from the auxiliary code 104 are directed to the application 106. The isolation component 108 receives and securely isolates the auxiliary code 104 in the isolated environment 110 using a least one of a machine isolation level, a process isolation level, or an application domain code access isolation level. The penalty component 202 tracks the penalty points accumulated via the individual auxiliary code 104, and disables the auxiliary code 104 if the threshold is crossed in response to abnormal execution behavior of the auxiliary code 104. The management component 112 monitors and manages execution of the auxiliary code 104 in the isolated environment 110 based on the penalty points.

The management component 112 blocks execution of the auxiliary code 104 by disallowing execution of the disabled auxiliary code 104 based on an accumulated total of the penalty points applied in response to the abnormal execution behavior. The management component 112 blocks auxiliary code of a publisher from being executed based on a history of the publisher providing misbehaving auxiliary code. Additionally, the management component 112 prevents registration of new auxiliary code from an organization based on penalty points accumulated across existing auxiliary code from the organization that has been or is being executed. The auxiliary code 104 is a third-party plug-in received for execution with the application 106, which is a server application, and the isolation component 108 is part of a sandbox server to which the auxiliary code 104 is sent for isolated execution.

Figure 3:
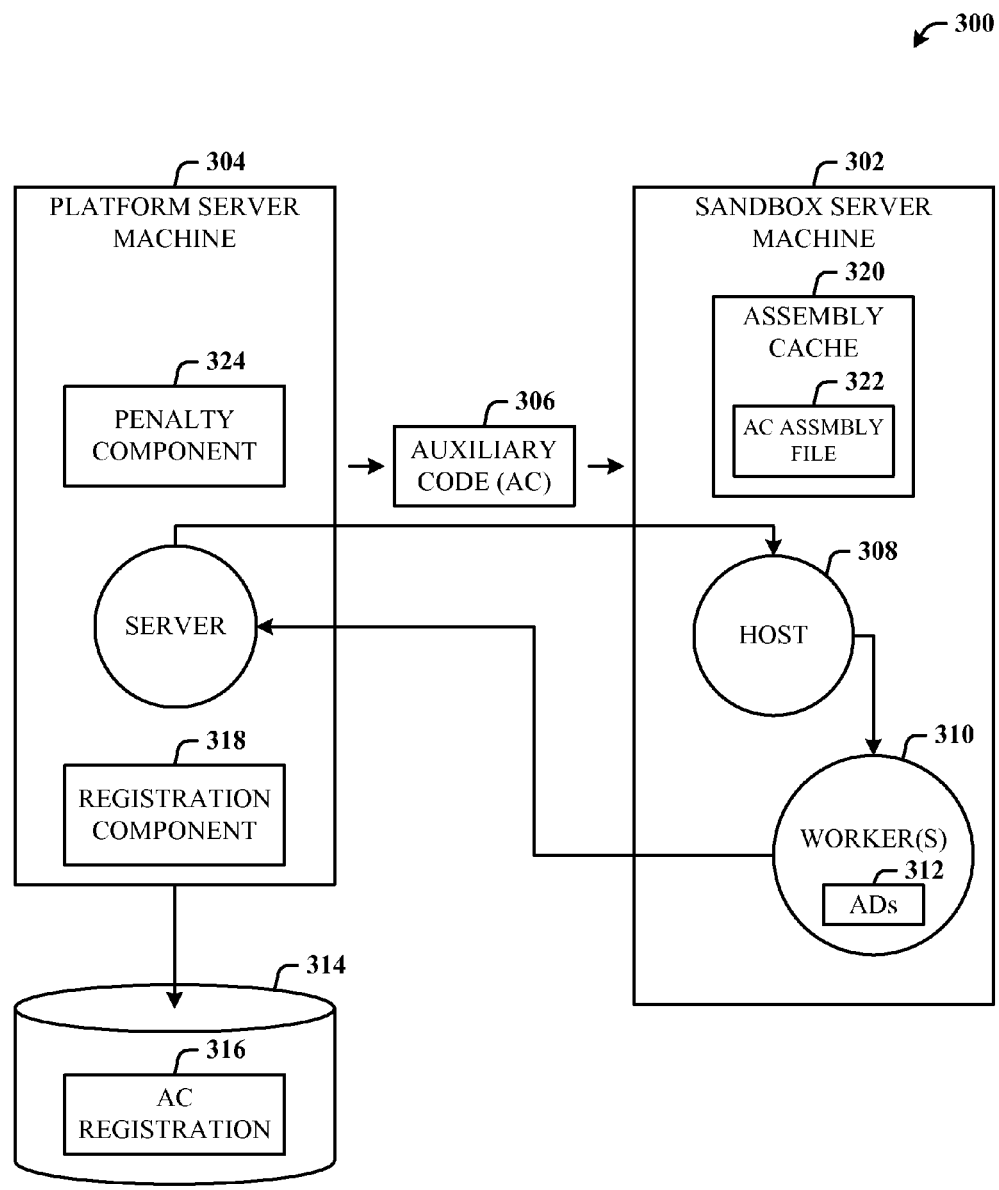
FIG. 3 illustrates an exemplary program management architecture.

FIG. 3 illustrates an exemplary program management architecture 300. The program management architecture 300 can include a standalone sandbox server machine 302 (for an isolation environment) or an enhancement to an existing platform server machine 304. The architecture 300 can include a server "role" that is defined in the platform server machine 304 as a "sandbox server". The sandbox server machine 302 can be a separate, dedicated server machine that safely executes the auxiliary code (AC) 306, also referred to as "plug-in". However, this is not a requirement, in that the sandbox server functionality can be collocated on the platform server machine 304. In this embodiment, the architecture 300 is described in the context of the .Net framework; however, other similar implementations may be employed when using other operating systems. (The .Net framework is commonly applied in operating systems by Microsoft Corporation, which comprises a library of pre-coded solutions for interoperability with new applications.) The auxiliary code 306 can be a .Net component contained within .Net assemblies that have a well defined interface.

The sandbox server machine 302 includes a host process 308, depicted as "Host", (e.g., implemented as an operating system (OS) service). The host process 308, as a single process, for example, can manage one or more worker processes 310, depicted as "Worker(s)". The worker processes 310 can include one or more application domains (ADs) 312 (referred to as AppDomains in the .Net framework), which can be used to isolate running code within the worker process 310. Thus, the sandbox auxiliary code 306 can have three levels of isolation: machine, process, and application domain.

The application domains can be restricted using code access security (CAS), a .Net mechanism, to limit the .Net code to "execute" privileges only. The CAS uses identifiers associated with a specific assembly. The auxiliary code 306 executes only within one of the restricted application domains 312. The host process 308 and worker process(es) 310 can run under low privilege accounts, which can only perform very limited functions within the sandbox server machine 302.

The auxiliary code 306 is registered in a platform server database 314 as auxiliary code (AC) registration 316 using a registration component 318. However, registration by the registration component 318 is not allowed if the number of accumulated penalty points has crossed the threshold. Moreover, the registration component 318 allows registration of only signed assemblies. The registration component 318 does not allow registration of assemblies from publishers that have been marked as unsafe. Assemblies can be registered to run without isolation if the publisher is marked as safe. To be executed, the auxiliary code 306 is transmitted from the platform server machine 304 to the sandbox server machine 302.

An assembly cache 320 is maintained on the sandbox server machine 302. The assembly cache 320 stores an auxiliary code assembly file 322 (denoted "AC Assembly File") for each auxiliary code assembly. When the auxiliary code 306 is to be executed on the sandbox server machine 302, the assembly cache 320 is checked to determine if the cache 320 already contains the correct auxiliary code 306 for execution. If not, that auxiliary code 306 is fetched from the platform server database 314 and transmitted to the sandbox server machine 302, where the auxiliary code 306 is stored as the auxiliary code assembly file 322 in the assembly cache 320. Each auxiliary code assembly file 322 is uniquely identified so that versioning can applied and work correctly.

Periodically, old auxiliary code assembly files are cleaned up from the assembly cache 320. There are whole sets of management functionality around assembly cache, such as limiting the total size of the assembly cache, limiting the total size of the assembly cache per organization, limiting the total life time of the assembly in the assembly cache etc. The auxiliary code assembly file is considered old if the version is old, that is, the assembly has been updated to a new one or if the assembly has been in the cache beyond the allowed time.

The assembly cache 320 implementation can vary. For example, rather than storing as simple files, the cache 320 can be implemented with a local database and with assemblies located in it. The assembly cache 320 is an optimization step so as to not keep transferring the same data across communication channels on every call.

To allow the auxiliary code 306 to do useful work, the auxiliary code 306 is given an interface by which to perform platform server machine functions. This interface is managed by the worker process 310, and ensures that all calls to the platform server machine 304 by the auxiliary code 306 go back to the originating platform server (here, the platform server machine 304). This can be employed only when wanting to maintain transactional integrity. Going back to the same server offers simplicity in the design. There exist both inside transaction plug-ins and outside transaction plug-ins. The outside transaction plug-ins can go to different platform servers.

This allows an identifier for the transaction to be recognized back at the originating platform server (the platform server machine 304) so that the platform server machine 304 can associate new work performed by the auxiliary code 306 with the original transaction. This means that all work performed by sandboxed auxiliary code 306 on a transaction are performed in the correct transaction context and removes any need for distributed transactions.

If the auxiliary code 306 throws an unexpected exception, crashes, uses excessive CPU time or memory, etc., at the sandbox server machine 302, the originating platform server machine 304 recognizes this, and using a penalty component 324, causes penalty points to be accumulated for the auxiliary code assembly that includes the auxiliary code 306. If the number of penalty points for the auxiliary code assembly is exceeded, then that auxiliary code assembly is disabled, and one or more sets of auxiliary code contained within the assembly will no longer execute.

However, at this point, the assembly can be unregistered and registered again using the registration component 318. Accordingly, a count is kept of the number of times an assembly has been disabled. If that exceeds a defined threshold, then the assembly is prevented from further registration until an administrative action is performed. Alternatively, the disabled assembly can simply be re-enabled.

Additionally, if the total number of penalty points for all auxiliary code assemblies registered for an organization exceeds a predetermined threshold, then all further registration of auxiliary code sets for that organization is prevented until some administrative action is taken.

Furthermore, a table of blocked publishers is maintained that facilitates the blocking of a publisher due to an inordinate number of errors or crashes, then the associated auxiliary code assemblies that contain the publisher identity will not be registered, reregistered, or executed.

Transactional integrity of the architecture 300 is maintained through multiple levels of plug-in execution on different sandbox server machines by returning to the originating platform server 304 for operations.

There can also be a rewards process that decrements the penalty points if the assembly has been running correctly for some time. This ensures that random failures over a period of time do not cause the assembly to get disabled.

Figure 4:
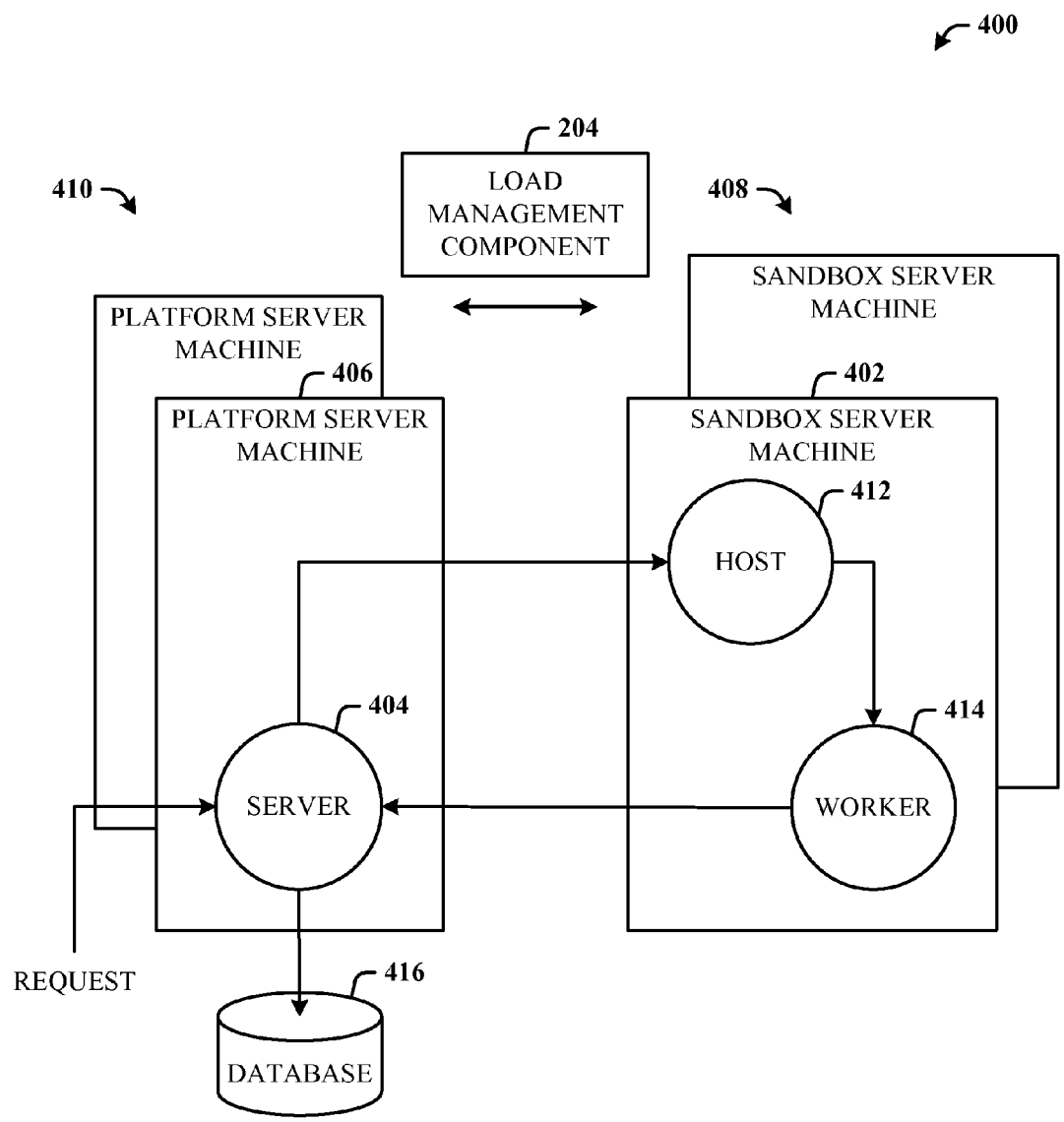
FIG. 4 illustrates a more general system for program management using a sandbox server.

FIG. 4 illustrates a more general system 400 for program management using a sandbox server 402. In operation, when an operation of platform server 404 of a platform server machine 406 is performed that has an associated sandboxed plug-in step, an available sandbox server machine (e.g., the sandbox server 402) is selected from a list of configured sandbox server machines 408. The selection process can be based on a load balancing algorithm of the load management component 204. The sandbox server machines 408 are periodically queried by the load management component 204 to ascertain availability and load. The load management component 204 can be a part of each of the platform server machines 410, for example.

An execution request is forwarded to a host process 412 on the sandbox server machine 402. The host process 412 determines whether the assembly is available in an assembly cache of the sandbox machine 402, and if not, requests the assembly from the originator server (the platform server machine 406). When the assembly is in the assembly cache, the host process 412 selects a worker process 414 from an available pool, and forwards the execution request to that worker process 414. The host process 412 maintains a pool of worker processes, monitors worker process resource usage (e.g., memory, CPU usage, etc.), and shuts down worker processes, if limits are exceeded.

The selection of the worker process could follow different strategies such as round robin, random, or with some affinity. One strategy is to keep a list of free worker processes. If a request comes for one organization, a check is made to determine if that organization is being served by a working worker process. If yes, the request is routed to that worker process; otherwise, pick a new worker process from the available free worker process pool and use it.

The worker process 414 creates and/or selects the appropriate CAS restricted application domain within the worker process 414 and loads the desired plug-in assembly and class. The worker process 414 then calls "Execute" on the plug-in which can then make calls with associated parameters to the appropriate platform server machine 406, which includes an interface by which the plug-in can perform platform server operations. In addition, the plug-in is provided with an interface by which the plug-in can perform tracing. Should the plug-in misbehave and accumulate a number of penalty points that exceeds a predetermined penalty threshold, the plug-in is prevented from further execution by disabling in a database 416 via the platform server 404. If the plug-in has been disabled a number of times that exceeds the threshold, then further registration of that assembly is disabled. If a total disabled count across all plug-in sets crosses another threshold, then all plug-in registration can be disabled for that organization. The plug-in interface is extensible; hence, additional services can be provided to the plug-in.

Included herein is a set of flow charts representative of exemplary methodologies for performing novel aspects of the disclosed architecture. While, for purposes of simplicity of explanation, the one or more methodologies shown herein, for example, in the form of a flow chart or flow diagram, are shown and described as a series of acts, it is to be understood and appreciated that the methodologies are not limited by the order of acts, as some acts may, in accordance therewith, occur in a different order and/or concurrently with other acts from that shown and described herein. For example, those skilled in the art will understand and appreciate that a methodology could alternatively be represented as a series of interrelated states or events, such as in a state diagram. Moreover, not all acts illustrated in a methodology may be required for a novel implementation.

Figure 5:
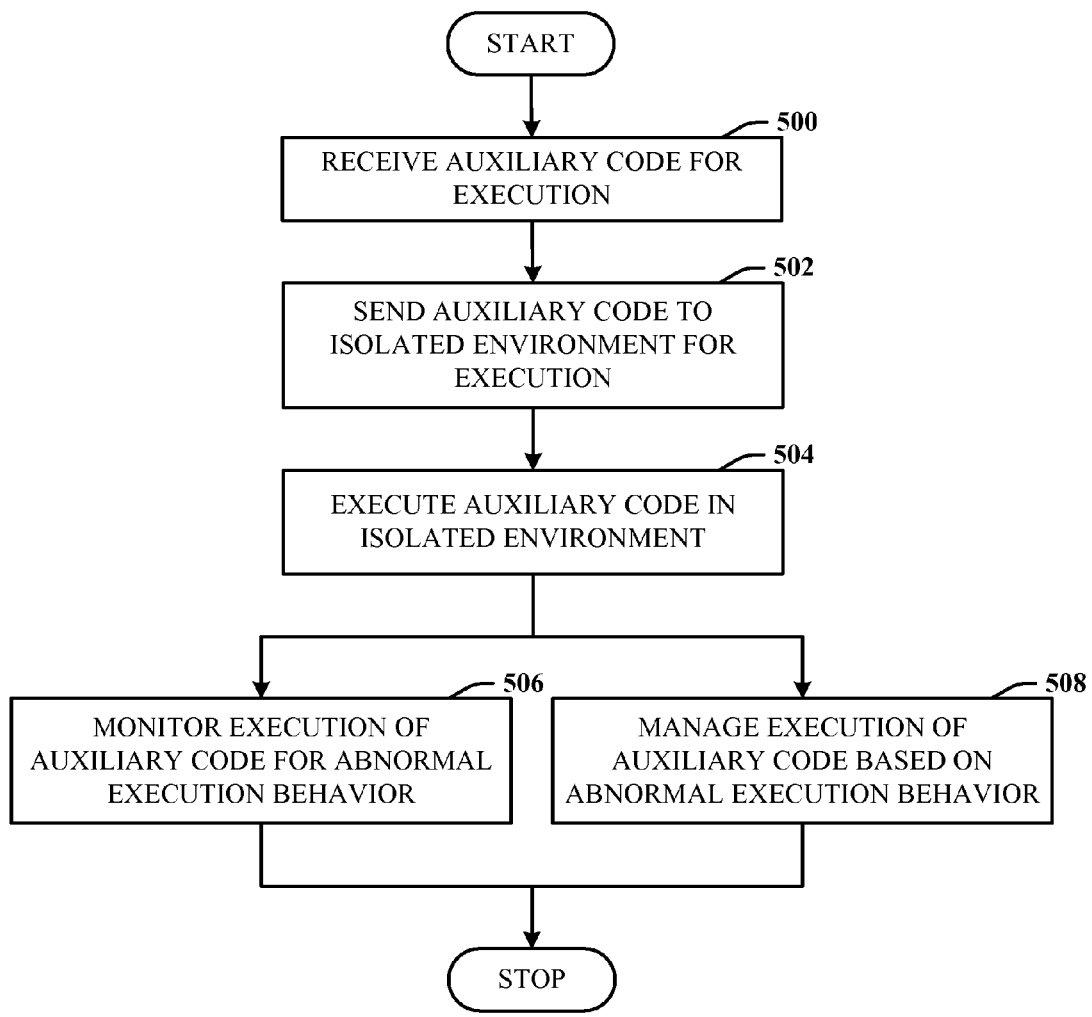
FIG. 5 illustrates a method of managing a program.

FIG. 5 illustrates a method of managing a program. At 500, auxiliary code is received for execution. At 502, the auxiliary code is sent to an isolated environment for execution. At 504, the auxiliary code is executed in the isolated environment. At 506, execution of the auxiliary code is monitored for abnormal execution behavior. At 508, execution of the auxiliary code is managed based on the abnormal execution behavior.

Additional aspects of the method can include scheduling the auxiliary code for isolation execution as part of the main operation. Additionally, after 504, results can be returned back to the platform, and the main operation continues.

Figure 6:
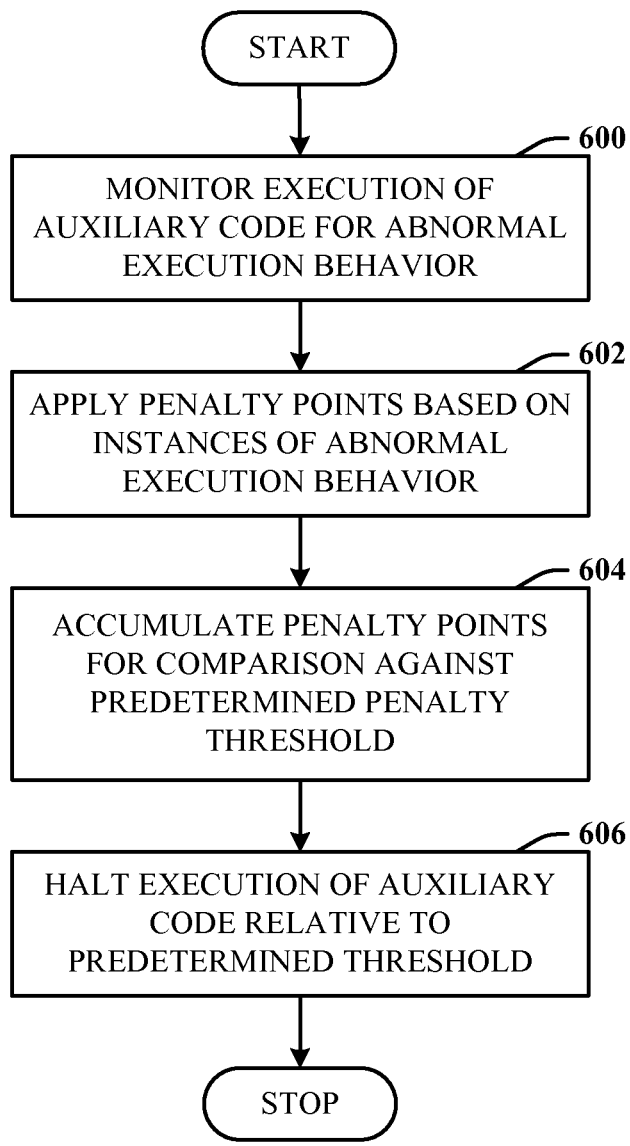
FIG. 6 illustrates a method of managing auxiliary code based on penalty points.

FIG. 6 illustrates a method of managing auxiliary code based on penalty points. At 600, execution of the auxiliary code is monitored for abnormal execution behavior. At 602, penalty points are applied based on instances of abnormal execution behavior of the auxiliary code. At 604, penalty points are accumulated for comparison against a predetermined penalty threshold. At 606, execution of the auxiliary code is halted relative to the predetermined threshold.

Figure 7:
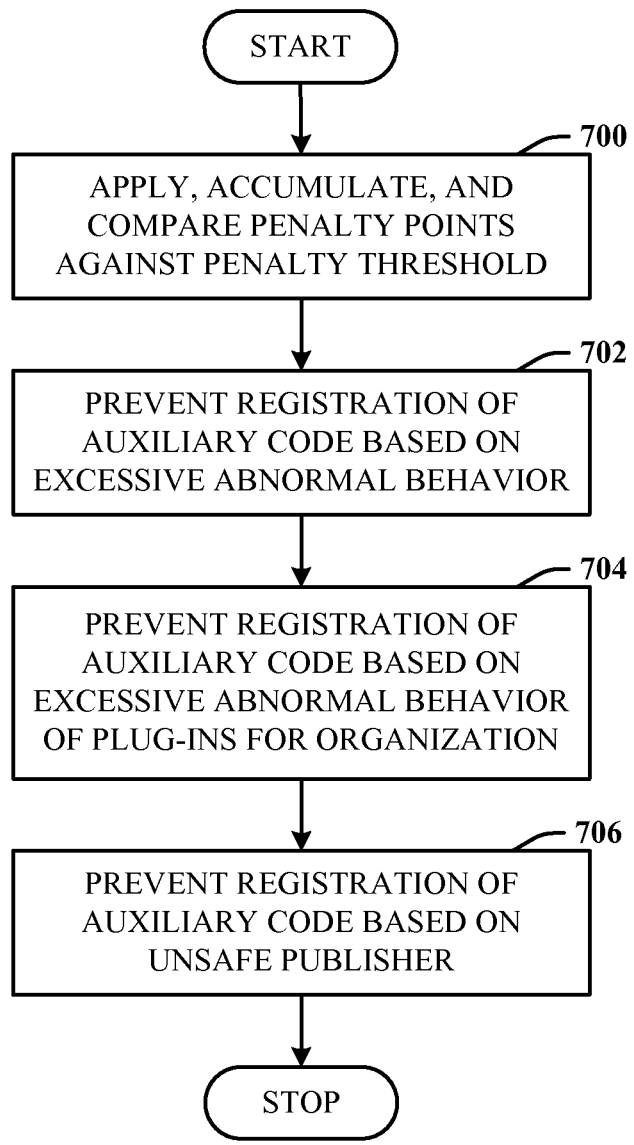
FIG. 7 illustrates a method of managing registration based on penalty points.

FIG. 7 illustrates a method of managing registration based on penalty points. At 700, penalty points are applied, accumulated, and compared against a penalty threshold. At 702, registration of auxiliary code is prevented based on excessive abnormal behavior, as determined by the number of accumulated penalty points. At 704, registration of auxiliary code is prevented based on excessive abnormal behavior of an plug-ins for an organization. At 706, registration of auxiliary code is prevented based on an unsafe publisher.

Figure 8:
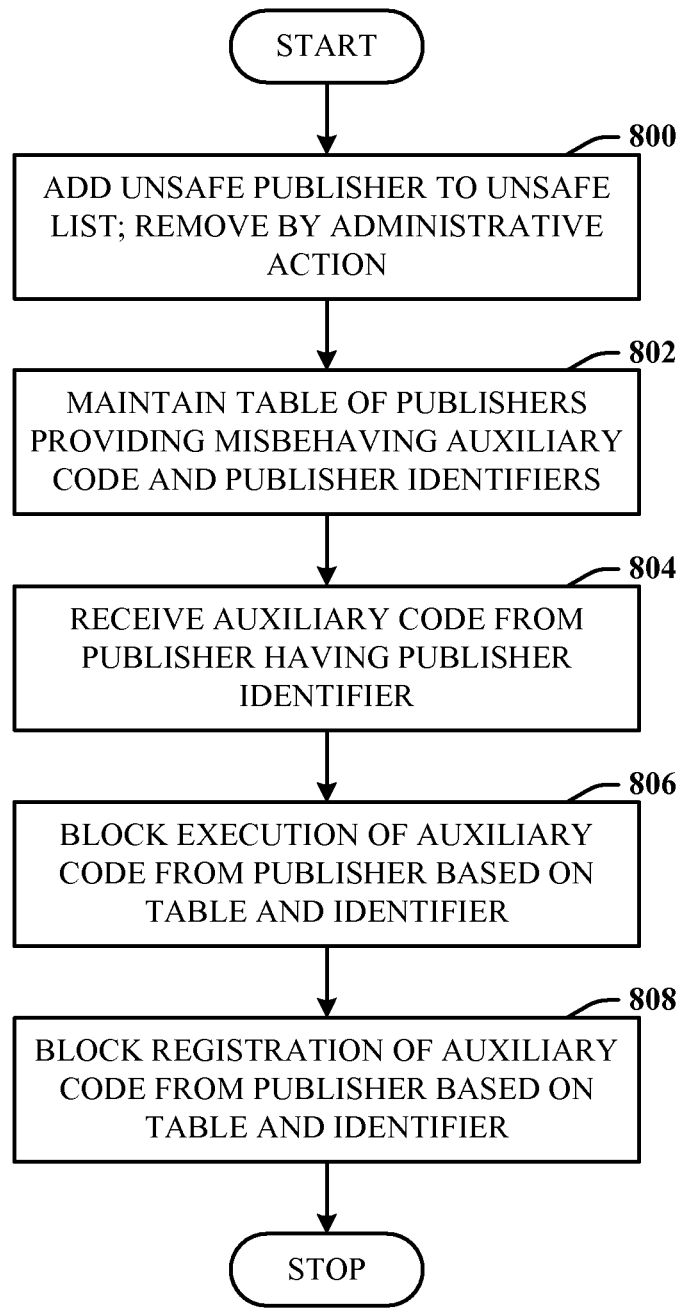
FIG. 8 illustrates a method of managing publishers of misbehaving auxiliary code.

FIG. 8 illustrates a method of managing publishers of misbehaving auxiliary code. At 800, an unsafe publisher is added to an unsafe publisher list; removal from the list can be by an administrative action. At 802, a table of publishers providing misbehaving auxiliary code and publisher identifiers is maintained. At 804, auxiliary code is received from publisher having publisher identifier. At 806, execution of the auxiliary code from publisher is blocked based on the table and the identifier. At 808, registration of the auxiliary code from the publisher is blocked based on the table and the identifier.

Figure 9:
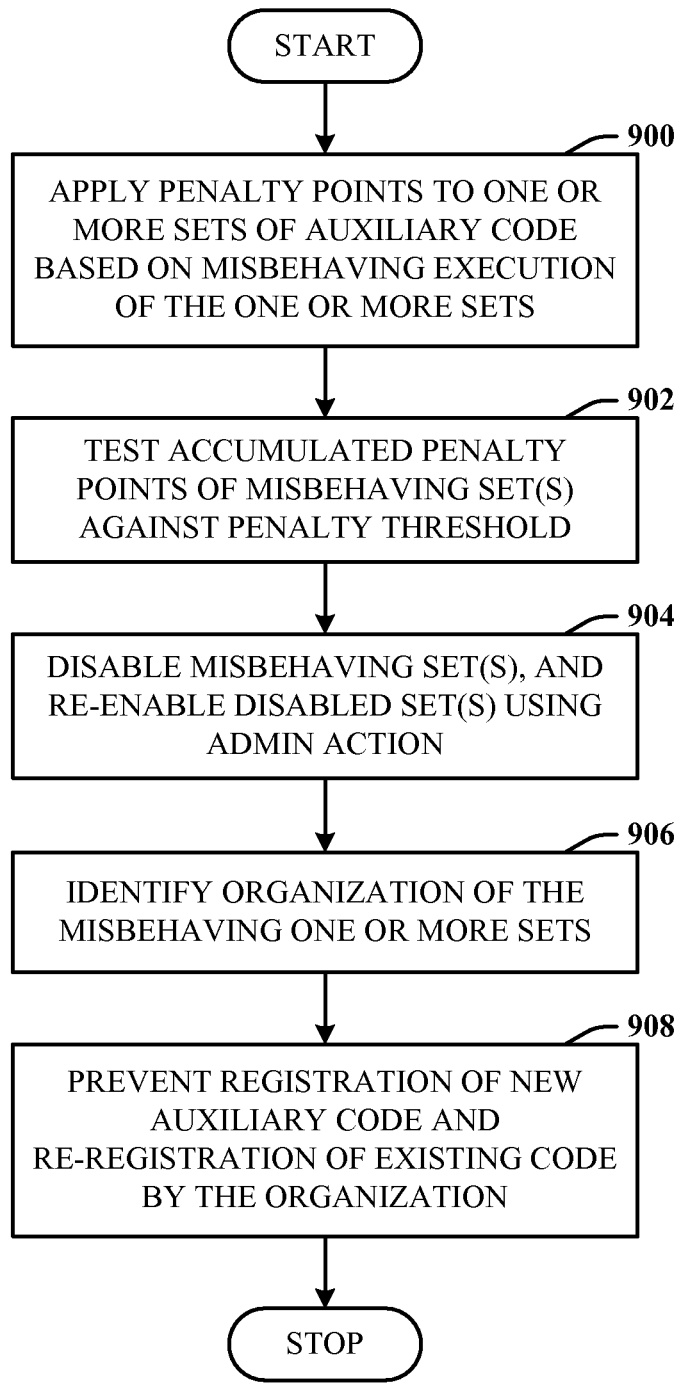
FIG. 9 illustrates a method of managing organizations based on misbehaving auxiliary code.

FIG. 9 illustrates a method of managing organizations based on misbehaving auxiliary code. At 900, penalty points are applied to one or more sets of auxiliary code based on misbehaving execution of the one or more sets. At 902, accumulated penalty points of misbehaving set(s) are tested against a penalty threshold. At 904, the misbehaving set(s) are disabled, and previously disabled set(s) can be re-enabled using an administrative action. At 906, an organization of the misbehaving one or more sets is identified. At 908, registration of new auxiliary code and re-registration of existing code by the organization is prevented.

Figure 10:
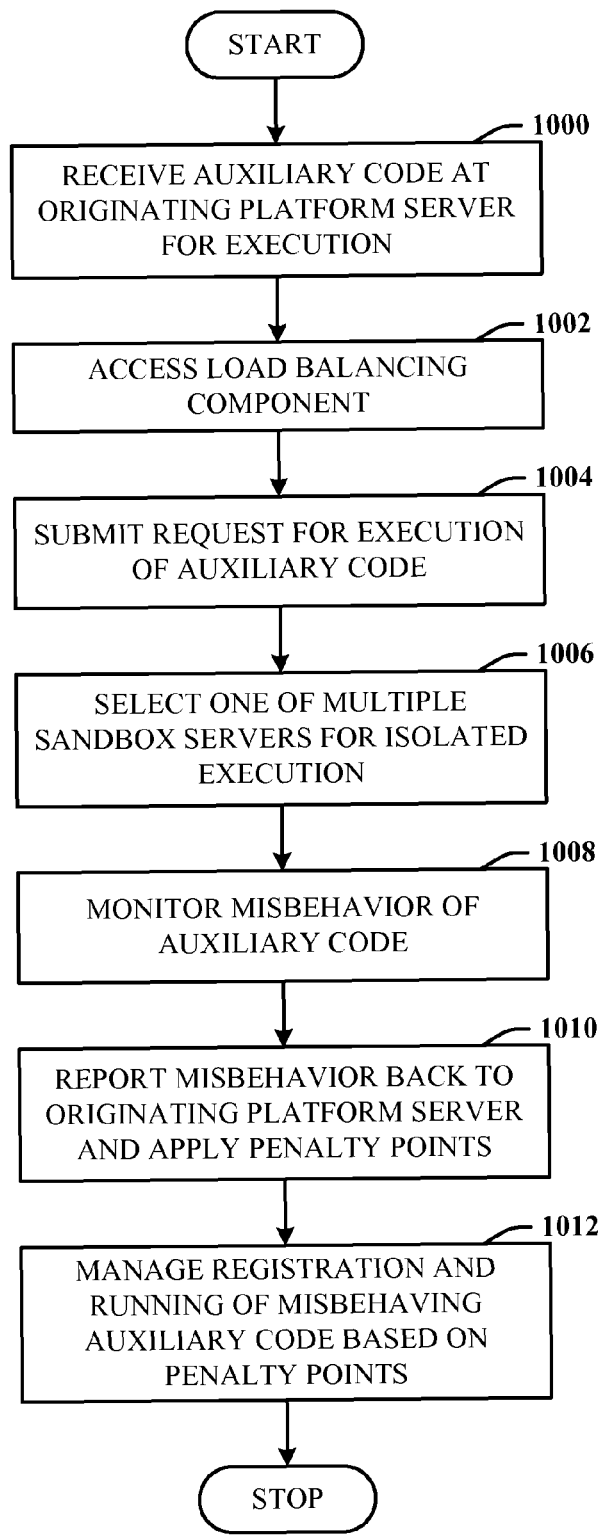
FIG. 10 illustrates a method of selecting a sandbox server based on load balancing.

FIG. 10 illustrates a method of selecting a sandbox server based on load balancing. At 1000, auxiliary code is received at an originating platform server for execution. At 1002, a load balancing component is accessed. At 1004, a request for execution of auxiliary code is submitted. At 1006, one of multiple sandbox servers is selected for isolated execution by the load balancing component. Different strategies for making the selection can be employed such as round robin, random, based on some affinity, etc. At 1008, misbehavior of auxiliary code is monitored. At 1010, the misbehavior is reported back to the originating platform server and penalty points are applied. At 1012, registration and running of the misbehaving auxiliary code is managed based on the penalty points.

As used in this application, the terms "component" and "system" are intended to refer to a computer-related entity, either hardware, a combination of hardware and software, software, or software in execution. For example, a component can be, but is not limited to being, a process running on a processor, a processor, a hard disk drive, multiple storage drives (of optical and/or magnetic storage medium), an object, an executable, a thread of execution, a program, and/or a computer. By way of illustration, both an application running on a server and the server can be a component. One or more components can reside within a process and/or thread of execution, and a component can be localized on one computer and/or distributed between two or more computers. The word "exemplary" may be used herein to mean serving as an example, instance, or illustration. Any aspect or design described herein as "exemplary" is not necessarily to be construed as preferred or advantageous over other aspects or designs.

Figure 11:
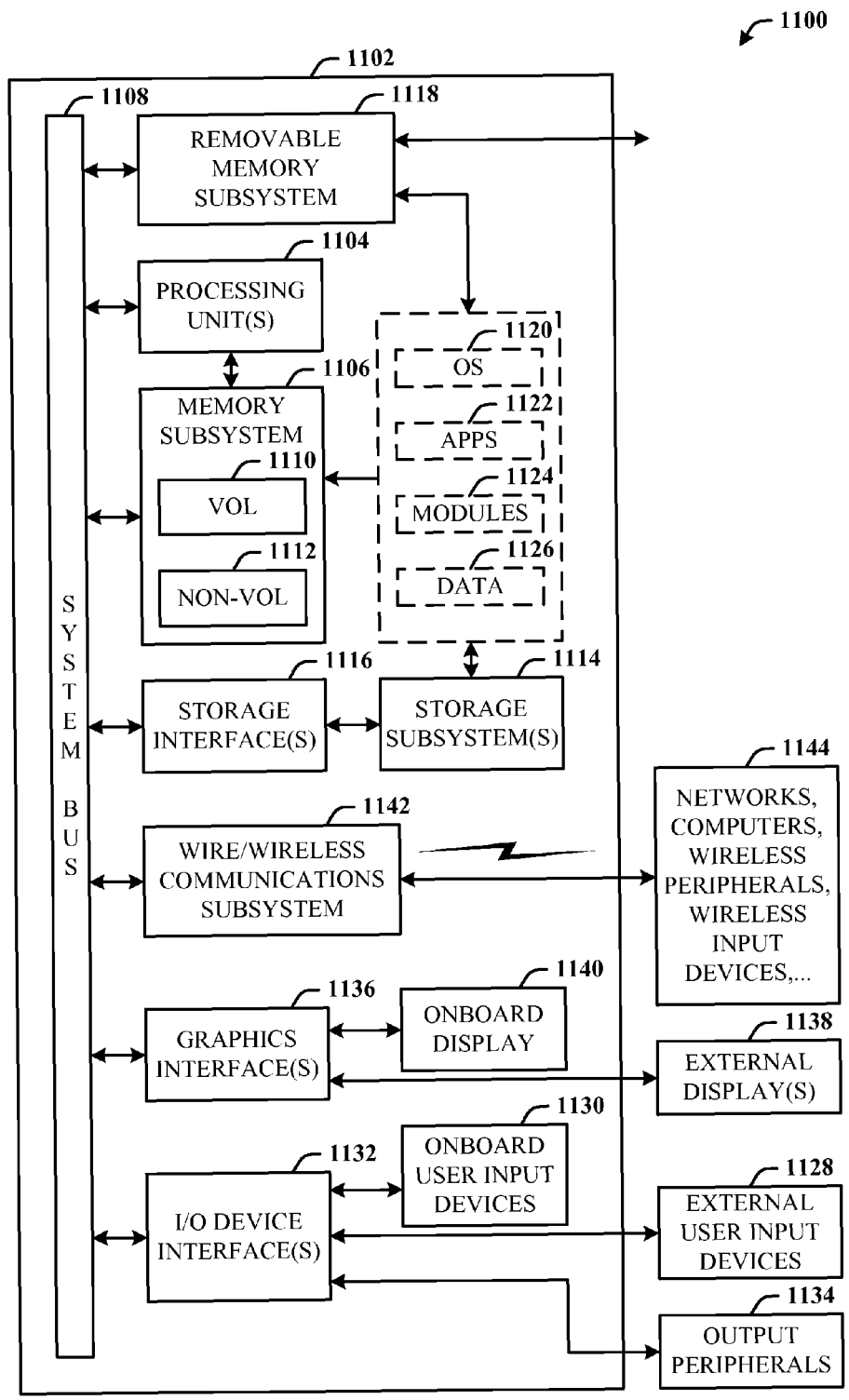
FIG. 11 illustrates a block diagram of a computing system operable to execute isolated plug-in execution in accordance with the disclosed architecture.

Referring now to FIG. 11, there is illustrated a block diagram of a computing system 1100 operable to execute isolated plug-in execution in accordance with the disclosed architecture. In order to provide additional context for various aspects thereof, FIG. 11 and the following discussion are intended to provide a brief, general description of the suitable computing system 1100 in which the various aspects can be implemented. While the description above is in the general context of computer-executable instructions that can run on one or more computers, those skilled in the art will recognize that a novel embodiment also can be implemented in combination with other program modules and/or as a combination of hardware and software.

The computing system 1100 for implementing various aspects includes the computer 1102 having processing unit(s)

1104, a system memory 1106, and a system bus 1108. The processing unit(s) 1104 can be any of various commercially available processors such as single-processor, multi-processor, single-core units and multi-core units. Moreover, those skilled in the art will appreciate that the novel methods can be practiced with other computer system configurations, including minicomputers, mainframe computers, as well as personal computers (e.g., desktop, laptop, etc.), hand-held computing devices, microprocessor-based or programmable consumer electronics, and the like, each of which can be operatively coupled to one or more associated devices.

The system memory 1106 can include volatile (VOL) memory 1110 (e.g., random access memory (RAM)) and non-volatile memory (NON-VOL) 1112 (e.g., ROM, EPROM, EEPROM, etc.). A basic input/output system (BIOS) can be stored in the non-volatile memory 1112, and includes the basic routines that facilitate the communication of data and signals between components within the computer 1102, such as during startup. The volatile memory 1110 can also include a high-speed RAM such as static RAM for caching data.

The system bus 1108 provides an interface for system components including, but not limited to, the memory subsystem 1106 to the processing unit(s) 1104. The system bus 1108 can be any of several types of bus structure that can further interconnect to a memory bus (with or without a memory controller), and a peripheral bus (e.g., PCI, PCIe, AGP, LPC, etc.), using any of a variety of commercially available bus architectures.

The computer 1102 further includes storage subsystem(s) 1114 and storage interface(s) 1116 for interfacing the storage subsystem(s) 1114 to the system bus 1108 and other desired computer components. The storage subsystem(s) 1114 can include one or more of a hard disk drive (HDD), a magnetic floppy disk drive (FDD), and/or optical disk storage drive (e.g., a CD-ROM drive DVD drive), for example. The storage interface(s) 1116 can include interface technologies such as EIDE, ATA, SATA, and IEEE 1394, for example.

One or more programs and data can be stored in the memory subsystem 1106, a removable memory subsystem 1118 (e.g., flash drive form factor technology), and/or the storage subsystem(s) 1114, including an operating system 1120, one or more application programs 1122, other program modules 1124, and program data 1126. Generally, programs include routines, methods, data structures, other software components, etc., that perform particular tasks or implement particular abstract data types. Where the computer 1102 is a server machine (e.g., platform server, sandbox server), the one or more application programs 1122, other program modules 1124, and program data 1126 can include the system 100 of FIG. 1, the system 200 of FIG. 2, the program management architecture 300 of FIG. 3, the general system 400, and methods of FIGS. 5-9, for example.

All or portions of the operating system 1120, applications 1122, modules 1124, and/or data 1126 can also be cached in memory such as the volatile memory 1110, for example. It is to be appreciated that the disclosed architecture can be implemented with various commercially available operating systems or combinations of operating systems (e.g., as virtual machines).

The storage subsystem(s) 1114 and memory subsystems (1106 and 1118) serve as computer readable media for volatile and non-volatile storage of data, data structures, computer-executable instructions, and so forth. Computer readable media can be any available media that can be accessed by the computer 1102 and includes volatile and non-volatile media, removable and non-removable media. For the computer 1102, the media accommodate the storage of data in any suitable digital format. It should be appreciated by those skilled in the art that other types of computer readable media can be employed such as zip drives, magnetic tape, flash memory cards, cartridges, and the like, for storing computer executable instructions for performing the novel methods of the disclosed architecture.

A user can interact with the computer 1102, programs, and data using external user input devices 1128 such as a keyboard and a mouse. Other external user input devices 1128 can include a microphone, an IR (infrared) remote control, a joystick, a game pad, camera recognition systems, a stylus pen, touch screen, gesture systems (e.g., eye movement, head movement, etc.), and/or the like. The user can interact with the computer 1102, programs, and data using onboard user input devices 1130 such a touchpad, microphone, keyboard, etc., where the computer 1102 is a portable computer, for example. These and other input devices are connected to the processing unit(s) 1104 through input/output (I/O) device interface(s) 1132 via the system bus 1108, but can be connected by other interfaces such as a parallel port, IEEE 1394 serial port, a game port, a USB port, an IR interface, etc. The I/O device interface(s) 1132 also facilitate the use of output peripherals 1134 such as printers, audio devices, camera devices, and so on, such as a sound card and/or onboard audio processing capability.

One or more graphics interface(s) 1136 (also commonly referred to as a graphics processing unit (GPU)) provide graphics and video signals between the computer 1102 and external display(s) 1138 (e.g., LCD, plasma) and/or onboard displays 1140 (e.g., for portable computer). The graphics interface(s) 1136 can also be manufactured as part of the computer system board.

The computer 1102 can operate in a networked environment (e.g., IP) using logical connections via a wire/wireless communications subsystem 1142 to one or more networks and/or other computers. The other computers can include workstations, servers, routers, personal computers, microprocessor-based entertainment appliance, a peer device or other common network node, and typically include many or all of the elements described relative to the computer 1102. The logical connections can include wire/wireless connectivity to a local area network (LAN), a wide area network (WAN), hotspot, and so on. LAN and WAN networking environments are commonplace in offices and companies and facilitate enterprise-wide computer networks, such as intranets, all of which may connect to a global communications network such as the Internet.

When used in a networking environment the computer 1102 connects to the network via a wire/wireless communication subsystem 1142 (e.g., a network interface adapter, onboard transceiver subsystem, etc.) to communicate with wire/wireless networks, wire/wireless printers, wire/wireless input devices 1144, and so on. The computer 1102 can include a modem or has other means for establishing communications over the network. In a networked environment, programs and data relative to the computer 1102 can be stored in the remote memory/storage device, as is associated with a distributed system. It will be appreciated that the network connections shown are exemplary and other means of establishing a communications link between the computers can be used.

The computer 1102 is operable to communicate with wire/wireless devices or entities using the radio technologies such as the IEEE 802.xx family of standards, such as wireless devices operatively disposed in wireless communication (e.g., IEEE 802.11 lover-the-air modulation techniques) with, for example, a printer, scanner, desktop and/or portable computer, personal digital assistant (PDA), communications satellite, any piece of equipment or location associated with a wirelessly detectable tag (e.g., a kiosk, news stand, restroom), and telephone. This includes at least Wi-Fi (or Wireless Fidelity) for hotspots, WiMax, and Bluetooth™ wireless technologies. Thus, the communications can be a predefined structure as with a conventional network or simply an ad hoc communication between at least two devices. Wi-Fi networks use radio technologies called IEEE 802.11x (a, b, g, etc.) to provide secure, reliable, fast wireless connectivity. A Wi-Fi network can be used to connect computers to each other, to the Internet, and to wire networks (which use IEEE 802.3-related media and functions).

The illustrated aspects can also be practiced in distributed computing environments where certain tasks are performed by remote processing devices that are linked through a communications network. In a distributed computing environment, program modules can be located in local and/or remote storage and/or memory system.

Figure 12:
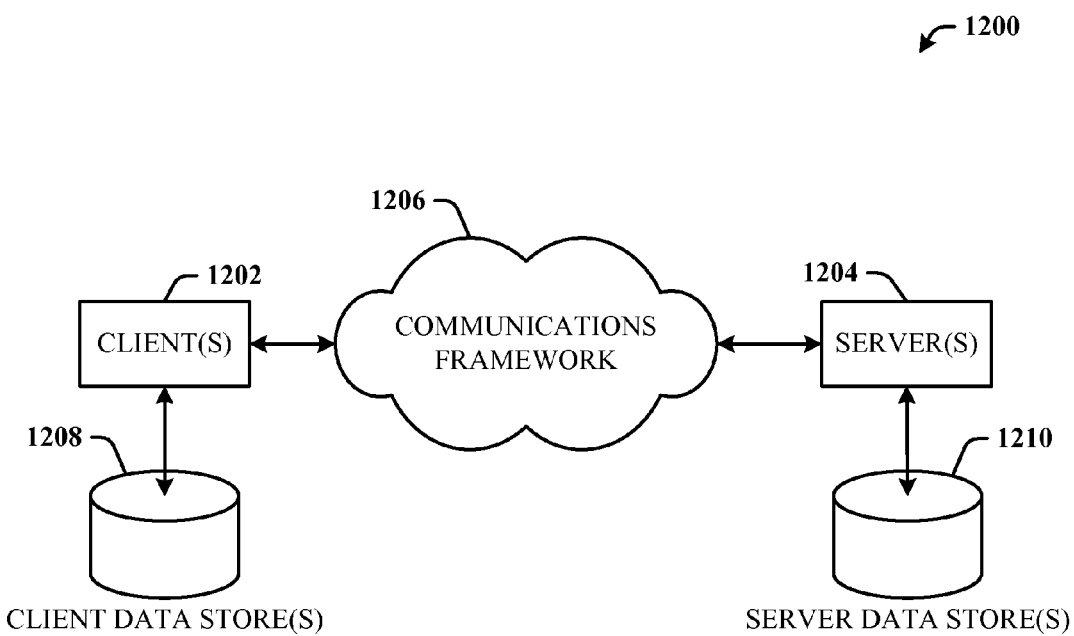
FIG. 12 illustrates a schematic block diagram of a computing environment for program management of plug-in isolation.

Referring now to FIG. 12, there is illustrated a schematic block diagram of a computing environment 1200 for program management of plug-in isolation. The environment 1200 includes one or more client(s) 1202. The client(s) 1202 can be hardware and/or software (e.g., threads, processes, computing devices). The client(s) 1202 can house cookie(s) and/or associated contextual information, for example.

The environment 1200 also includes one or more server(s) 1204. The server(s) 1204 can also be hardware and/or software (e.g., threads, processes, computing devices). The servers 1204 can house threads to perform transformations by employing the architecture, for example. One possible communication between a client 1202 and a server 1204 can be in the form of a data packet adapted to be transmitted between two or more computer processes. The data packet may include a cookie and/or associated contextual information, for example. The environment 1200 includes a communication framework 1206 (e.g., a global communication network such as the Internet) that can be employed to facilitate communications between the client(s) 1202 and the server(s) 1204.

Communications can be facilitated via a wire (including optical fiber) and/or wireless technology. The client(s) 1202 are operatively connected to one or more client data store(s) 1208 that can be employed to store information local to the client(s) 1202 (e.g., cookie(s) and/or associated contextual information). Similarly, the server(s) 1204 are operatively connected to one or more server data store(s) 1210 that can be employed to store information local to the servers 1204.

What has been described above includes examples of the disclosed architecture. It is, of course, not possible to describe every conceivable combination of components and/or methodologies, but one of ordinary skill in the art may recognize that many further combinations and permutations are possible. Accordingly, the novel architecture is intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. A computer-implemented program management system, comprising:
    an interface component for receiving auxiliary code for execution with a server application, the interface component located with the server application on a server machine in a corporate hosted environment;
    an isolation component for receiving and securely isolating the auxiliary code in an isolated environment using levels of isolation including an application domain that isolates running code within worker processes, to provide an application domain isolation level;
    a management component for monitoring and managing execution of the auxiliary code in the isolated environment based in part on abnormal execution behavior; and
    a microprocessor that executes computer-executable instructions associated with at least one of the interface component, the isolation component, or the management component.

2. The system of claim 1, wherein the auxiliary code is a third-party plug-in received for execution with the application, which is a server application, and the isolation component is part of a sandbox server to which the auxiliary code is sent for isolated execution.

3. The system of claim 1, wherein the one or more isolation levels further include at least one of a machine isolation level or a process isolation level.

4. The system of claim 1, wherein the interface component ensures that calls from the auxiliary code are directed to the application.

5. The system of claim 1, wherein the management component stops execution of the auxiliary code by disabling the auxiliary code based on an accumulated total of penalty points applied in response to the abnormal execution behavior.

6. The system of claim 1, further comprising a penalty component for tracking penalty points accumulated by the auxiliary code based on the abnormal execution behavior.

7. The system of claim 1, further comprising a load management component for selecting one or more existing isolation components based on increased execution load.

8. A computer-implemented program management system, comprising:
    an interface component for receiving auxiliary code for execution with a server application and ensuring that calls from the auxiliary code are directed to the application, the interface component located with the server application on a server machine in a corporate hosted environment;
    an isolation component for receiving and securely isolating the auxiliary code in an isolated environment using a least one of a machine isolation level, a process isolation level, or an application domain code access isolation level;
    a penalty component for tracking penalty points accumulated by the auxiliary code in response to abnormal execution behavior;
    a management component for monitoring and managing execution of the auxiliary code in the isolated environment based on the penalty points; and
    a microprocessor that executes computer-executable instructions associated with at least one of the interface component, the isolation component, the penalty component, or the management component.

9. The system of claim 8, wherein the management component blocks execution of the auxiliary code by blocking registration of the auxiliary code based on an accumulated total of the penalty points applied in response to the abnormal execution behavior.

10. The system of claim 8, wherein the management component blocks auxiliary code of a publisher from being executed based on a history of the publisher providing misbehaving auxiliary code.

11. The system of claim 8, wherein the management component prevents registration of new auxiliary code from an organization based on penalty points accumulated across existing auxiliary code from the organization that has been or is being executed.

12. The system of claim 8, wherein the auxiliary code is a third-party plug-in received for execution with the application, which is a server application, and the isolation component is part of a sandbox server to which the auxiliary code is sent for isolated execution.

13. A computer-implemented method of managing a program performed by a computer system executing machine-readable instructions, the method comprising acts of:
receiving auxiliary code for execution at a server application on a server machine in a corporate hosted environment;
sending the auxiliary code to an isolated environment within the corporate hosted environment for execution, the isolated environment comprising at least one of a machine isolation level, a process isolation level, and an application domain code access isolation;
executing the auxiliary code in the isolated environment;
monitoring execution of the auxiliary code for abnormal execution behavior;
managing the execution of the auxiliary code based on the abnormal execution behavior; and
configuring a microprocessor to perform at least one of the acts of receiving, sending, executing, monitoring, or managing.

14. The method of claim 13, further comprising:
applying and accumulating penalty points based on the abnormal execution behavior; and
halting execution of the auxiliary code relative to a predetermined threshold of penalty points.

15. The method of claim 14, wherein the penalties points are based on abnormal behavior related to errors in execution of the auxiliary code.

16. The method of claim 13, further comprising preventing registration of the auxiliary code relative to a predetermined threshold of penalty points.

17. The method of claim 13, further comprising managing the auxiliary code based on a number of times the auxiliary code has been disabled.

18. The method of claim 13, further comprising preventing registration of new auxiliary code from an organization based on penalty points accumulated across existing auxiliary code from the organization that has been or is being executed.

19. The method of claim 13, further comprising blocking auxiliary code from a publisher from being executed based on a history of the publisher providing misbehaving auxiliary code.

20. The method of claim 13, further comprising selecting a sandbox server from among multiple sandbox servers based on load balancing data.

* * * * *